United States Patent [19]
Anderson

[11] 4,353,668
[45] Oct. 12, 1982

[54] HOPPER BOTTOM UNIT

[75] Inventor: Arthur I. Anderson, St. Paul, Minn.

[73] Assignee: North American Car Corporation, Chicago, Ill.

[21] Appl. No.: 144,850

[22] Filed: Apr. 29, 1980

[51] Int. Cl.³ .................... B65G 53/20; B65G 53/38
[52] U.S. Cl. .................................. 406/90; 406/138; 366/101
[58] Field of Search .................. 406/75, 85, 89, 90, 406/91, 134, 136, 137, 138; 222/195; 366/101, 107

[56]  References Cited
U.S. PATENT DOCUMENTS

| | | | |
|---|---|---|---|
| 3,062,414 | 11/1962 | Morris | 406/90 |
| 3,253,750 | 5/1966 | Paton | 406/90 |
| 3,758,162 | 9/1973 | Holm et al. | 406/85 |
| 3,929,261 | 12/1975 | Solimar | 406/137 X |

FOREIGN PATENT DOCUMENTS

2542725  3/1977  Fed. Rep. of Germany ...... 406/138

Primary Examiner—Jeffrey V. Nase
Attorney, Agent, or Firm—Lockwood, Dewey, Alex & Cummings

[57] ABSTRACT

A bottom unit for a material transportation car hopper includes a membrane which preferably is foraminous. The membrane is oriented at an angle with respect to horizontal and slopes toward a hopper discharge pipe. The bottom unit is separate from the discharge pipe. The bottom unit includes a vibrator for vibrating the membrane, and an air injection system for defining a film of air moving up through and across the membrane for sweeping material from the membrane and into the hopper material discharge system.

25 Claims, 12 Drawing Figures

HOPPER BOTTOM UNIT

BACKGROUND OF THE INVENTION

The present invention relates in general to material transport cars, and, more particulary, to hopper-type cars.

Hopper cars are commonly used to transport fluent material such as dry product. Dry products transported in this manner include flour, cement, sugar, starch, and the like. Some of these products must be highly fluidized to facilitate the unloading thereof, and U.S. Pat. No. 3,929,261 discloses a fluidization device.

Even with fluidization, some quantity of material remains in the car after the completion of a discharge process. In some cases, this quantity of remaining material can be quite significant, for example, several hundred pounds or residue of material is possible. This residue is most often found near the periphery of the hopper, and in the case of a side located outlet, in a location remote from that outlet. Even fluidization does not clear out such residue from prior art cars.

Accordingly, there is need for a device which will assure the nearly complete discharge of material from a hopper car, and reduce the amount of residue to insignificant, and possibly zero, levels.

SUMMARY OF THE INVENTION

The device embodying the teachings of the present invention prevents build-up of material adjacent a hopper material discharge outlet, and facilitates the complete emptying of such hopper.

The device includes a bottom unit which is attached to a hopper of a material transport car, such as a railroad car, truck, or the like. The bottom unit is separate and independent of the car discharge pipe, and is spaced therefrom.

The bottom unit can thus be changed without requiring a great deal of labor and time. Installation, maintenance, and the like are thus more efficient than in prior art devices which have the piping and discharge manifolds thereof connected to a bottom unit of the hopper.

The preferred form of the bottom unit of the present invention includes a foraminous membrane covering the hopper bottom and oriented in a plane which is sloped at an angle with respect to horizontal toward the discharge outlet of the hopper. Thus, discharge of material is gravity assisted.

A vibration producing means is connected to the membrane to cause that membrane to vibrate rapidly during discharge of the product through the hopper discharge outlet. The vibration producing means of the present invention includes a device such as that disclosed in U.S. Pat. No. 3,929,261, which therefore fluidizes the material as well as causes the membrane to vibrate rapidly. Other means are disclosed for vibrating the membrane.

The unit further includes means for flowing air upwardly through the membrane into the hopper. This air flow not only pressurizes the hopper, it also defines a film of air which moves across the membrane toward the hopper discharge outlet. This moving air film sweeps product off the membrane and toward the product discharge outlet, thereby further preventing residue build-up and further facilitating complete discharge of product from the hopper.

OBJECTS OF THE INVENTION

It is a main object of the present invention to discharge material from a hopper completely without leaving a significant amount of material residue.

It is another object of the present invention to prevent build-up of material adjacent a discharge outlet of a hopper.

It is yet another object of the present invention to facilitate movement of material into a hopper discharge outlet.

These together with other objects and advantages which will become subsequently apparent reside in the details of construction and operation as more fully hereinafter described and claimed, reference being had to the accompanying drawings forming part hereof, wherein like reference numerals refer to like parts throughout.

DETAILED DESCRIPTION OF THE INVENTION

Figure 1:
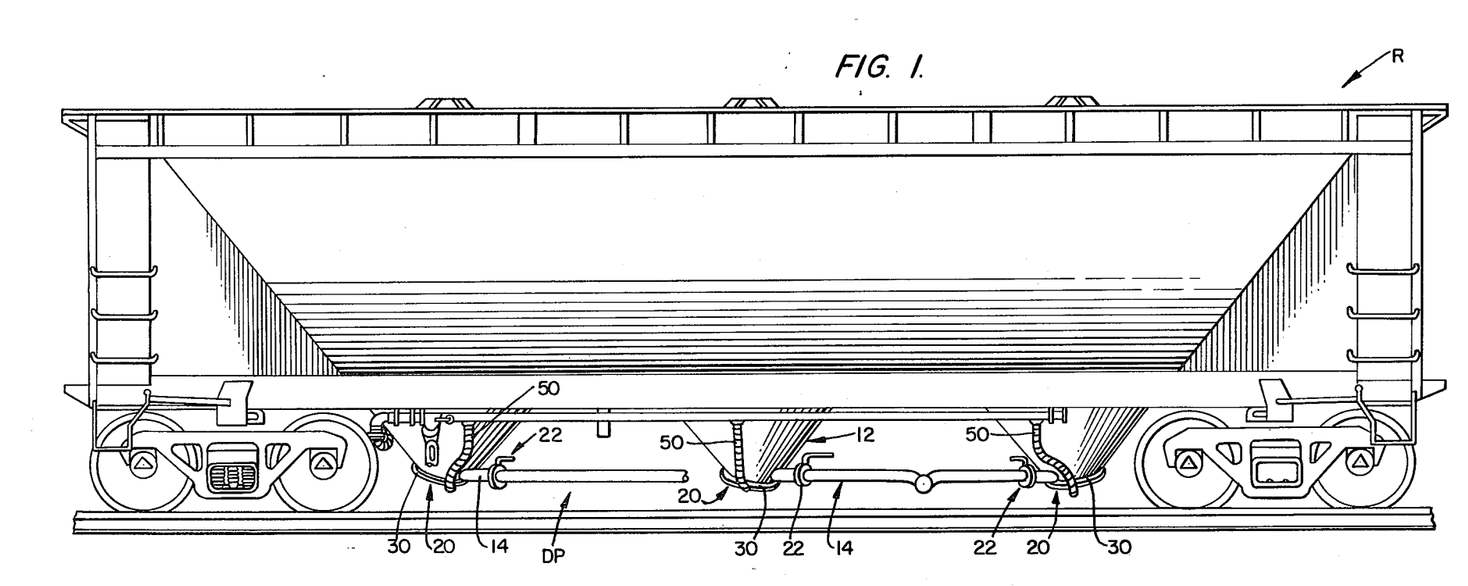
FIG. 1 is a side elevation of a railroad car which includes a hopper embodying the teachings of the present invention.
Figure 2:
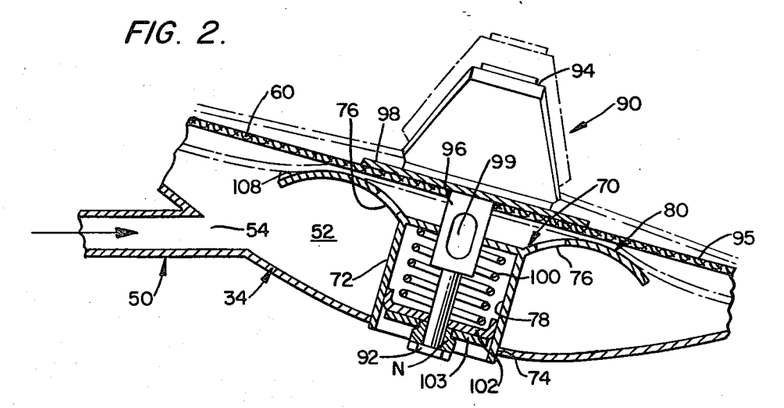
FIG. 2 is a side elevation of a hopper embodying the teachings of the present invention.
Figure 3:
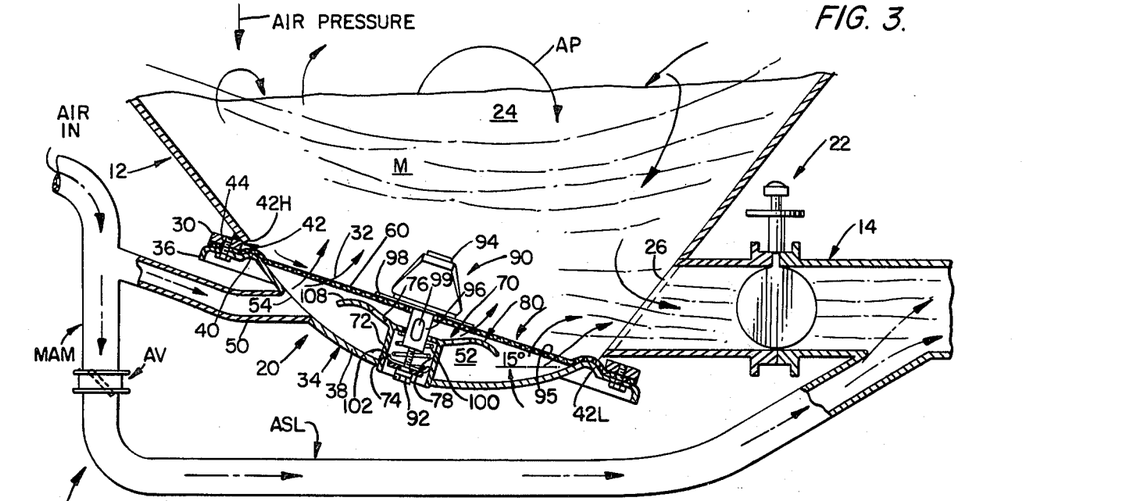
FIG. 3 is a side elevation of a hopper including the device embodying the teachings of the present invention.

Shown in FIGS. 2 and 3 is a dispensing means 20 which is used in conjunction with railroad cars, trucks, and the like, to transport fluent materials such as sugar, cement, starch or the like, or slurries, if so desired. As shown in FIG. 1, a car R includes a hopper 12 through which the material flows for discharge into a discharge piping system DP. As shown in FIG. 1, the car includes angled bottoms to the hoppers. This slant will be discussed in greater detail below. As above-discussed, those cars heretofore known include discharge piping as an integral portion of the hopper bottom, and accordingly, have created problems.

As best shown in FIGS. 2 and 3, the material dispensing means includes a discharge conduit 14 attached to the hopper adjacent the lowermost end thereof, and the car includes a bottom unit 20 which is independent of the discharge system DP. The dicharge conduit includes a shutoff valve 22 which can be a manual valve such as a butterfly valve, or the like, and is in fluid communication with interior 24 of the hopper via outlet port 26 whereby fluent material contained in the car is discharged therefrom via the discharge system attached to the hopper itself at a location above the lowermost portion of the hopper entity.

The bottom unit 20 includes an annular flange 30 securely attached to the hopper, as by welding, or the like, circumjacent hopper opening 32. The bottom unit includes a dish-shaped casing 34 which has an integral circumambient attaching flange 36 on the circumferential edge of a body section 38. Preferably, the casing has a circular peripheral shape. An annular bulging section 40 is defined in the body section to be inwardly adjacent the flange 36 and to be inwardly adjacent lip 42 of the hopper.

Fasteners, such as bolts 44, or the like, attach the flanges 30 and 36 together, and are located in aligned openings defined in such flanges.

An air inlet system AS includes an air supply (not shown) and an air hose 50 integrally attached to the body section 38 to be in fluid communication with interior 52 of the bottom unit 20, whereby air, or other such material, is introduced into the bottom unit interior via an air inlet port 54.

As shown in FIG. 3, the air system AS includes a main air manifold MAM having a control valve AV therein downstream of the hose 50. An air shunt line ASL connects the manifold MAM to the discharge line 14 downstream of both valve AV and valve 22. By controlling flow of air in the manifold MAM, air flow to the unit 20 and/or to the discharge conduit 14 is controlled. Such air flow controls the discharge of product from the hopper.

As shown in FIGS. 1 and 3, the bottom lip of the hopper is defined in a plane which is slanted with respect to horizontal. The plane is tilted so lowermost point 42L of the hopper lip is located subjacent outlet port 26, and highest point 42H of the lip is located diametrically opposite the outlet port 26. Preferably, the plane is tilted at an angle of 15° to the horizontal so that fluent material is gravity assisted as that material flows toward and through the outlet port 26.

A foraminous membrane 60 preferably formed of fabric, is attached to the bottom unit by being sandwiched between the flanges 30 and 36. The membrane spans the body section 38 to define a chamber therewith. The bottom unit thus forms a sector of a sphere. As shown in FIG. 3, the membrane covers the hopper opening 32. The membrane is elastic, and is deformable for a purpose which will be discussed below. In a preferred embodiment, the membrane is circular and is about 24 inches in diameter.

Figure 4:
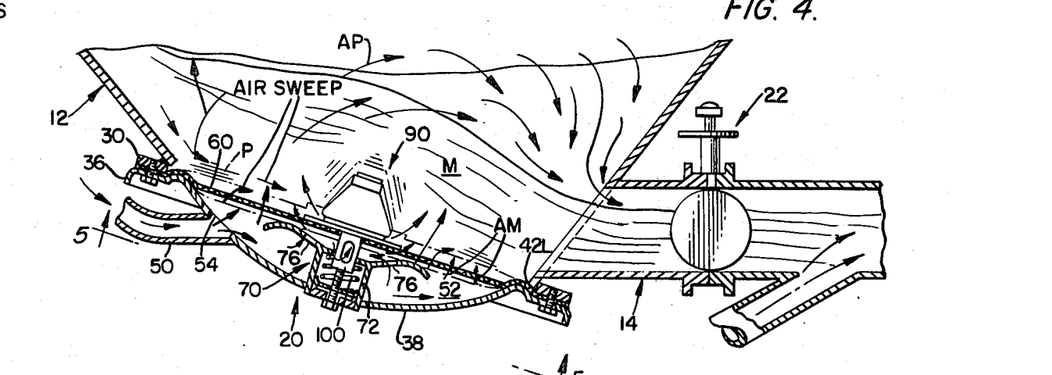
FIG. 4 is a side elevation of a hopper including the device embodying the teachings of the present invention indicating operation of such device.
Figure 5:
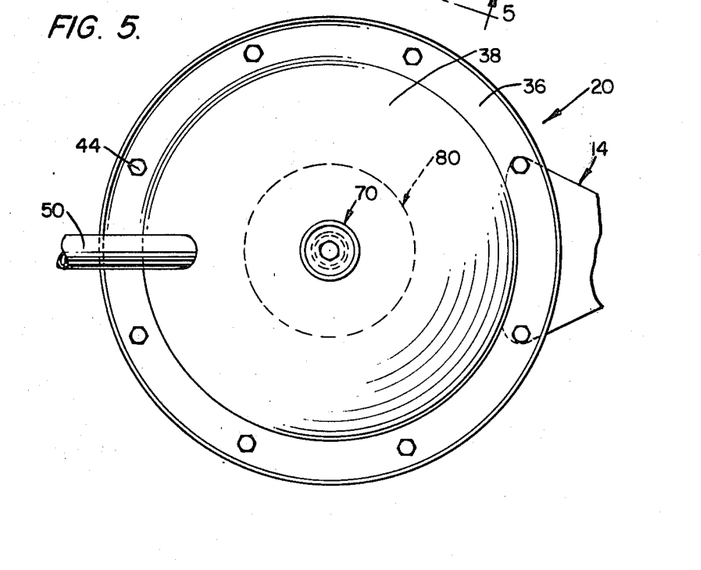
FIG. 5 is a view taken along line 5—5 of FIG. 4.

A membrane support 70 is attached to the body section near the center thereof, and includes a tubular body 72 having one end 74 thereof embedded in the body section, and the other end thereof located radially inward of the body section. The body section has a bore 78 extending longitudinally thereof. A sinuous, annular seat member 80 is integrally attached to the other end of the body, and is upwardly and radially outwardly curved. The annular seat member 80 includes holes 76 therein, as shown in FIG. 3, which direct the air to the underside of the membrane at its center, as shown in FIG. 4. The overall shape of the support 70 is that of a mushroom, and the support limits the movement of the membrane outwardly of the hopper, and supports the membrane when the hopper contains material. Due to the holes 76 in seat member 80, that member also functions as a baffle to direct air flow in the chamber 52.

An aerator 90 is mounted on the bottom unit and includes a support fastener 92 such as a bolt, or the like, attached at one end thereof to the body section 38, and an aerator device 94 mounted on the fastener 92 to be located in the hopper above top surface 95 of the membrane 60. The aerator device 94 includes a mounting bracket 96 attached to the fastener 92 and a bolster 98 seating the device 94 on the membrane top surface 95. The aerator device 94 is located to be aligned with the longitudinal axis of the tubular support body 72. A flow passage 99 is defined in the bracket 96, and a spring 100 surrounds the fastener 92. The spring is located within the bore 78 and is seated at one end thereof on an air seal 102, which, in turn, is seated on the inner surface of a retainer plate 103 by a nut N mounted on the bolt 92. The spring is movably attached at the other end thereof to the bracket 96.

The spring 100 thus damps movement of the aerator device 94 in a direction axial of the bolt, and the bolt prevents movement of the device 94 transversely thereof. Upper surface 108 of the seat member 80 limits the range of downward movement of the membrane, and contact between the bolt and the bracket 96 limits the range of upward movement of the membrane via the bolster 98. As will be apparent from the discussion below, the elastic and deformable nature of the membrane 60 also defines the limits of the range of movement of that membrane.

Preferably, the aerator device 94 includes a device similar to that disclosed in U.S. Pat. No. 3,929,261, and attention is directed thereto for a disclosure of such device, such disclosure being incorporated herein by reference thereto.

As shown in FIG. 4, when air is introduced into the interior 52 of the bottom unit at a certain rate, the membrane will billow upwardly from the FIG. 3 position toward the interior of the hopper. Air flows into the hopper via the holes in the foraminous membrane as indicated by arrows AM in FIG. 4. The air flows through the material M contained in the hopper and then back out of the hopper via port 26 as shown in FIGS. 3 and 4 by arrows AP. This air also serves to pressurize the product. The membrane is lifted off the support by this air flow; however, upward movement of the membrane is eventually snubbed by the aerator device. Air is also ejected from the aerator device while the air is being injected into the unit via the inlet hose 50.

As discussed in the referenced patent, the aerator device injects air in a pulsating manner, and thus the membrane aerator combination pulsates, or reciprocates rapidly as indicated by the phantom lines P in FIG. 4. Air flow into the unit 20 is adjusted to set up the rate of pulsating movement desired.

Figure 6:
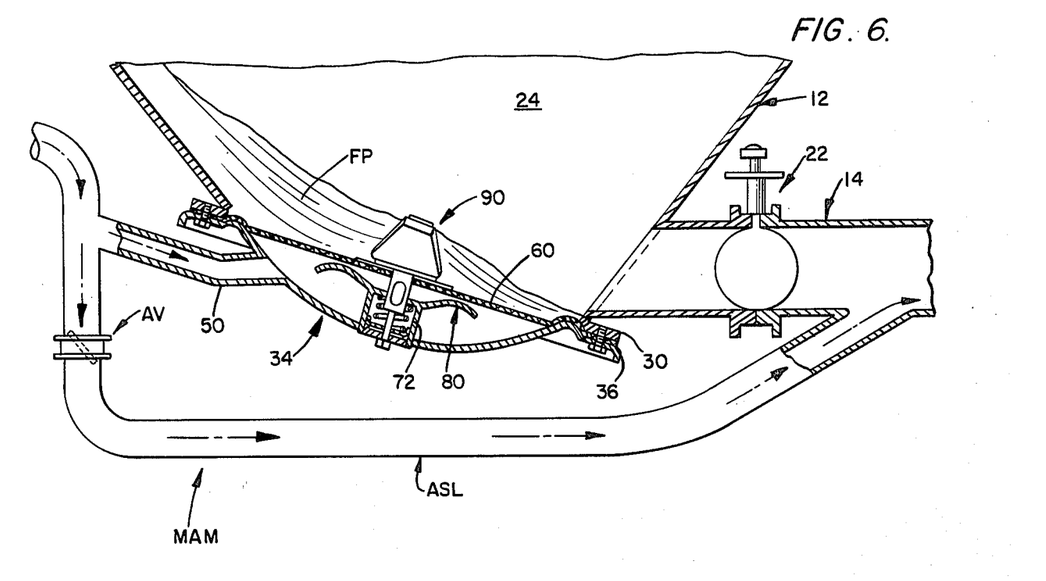
FIGS. 6 and 7 are side elevation views showing a hopper being emptied using the device embodying the teachings of the present invention.
Figure 7:
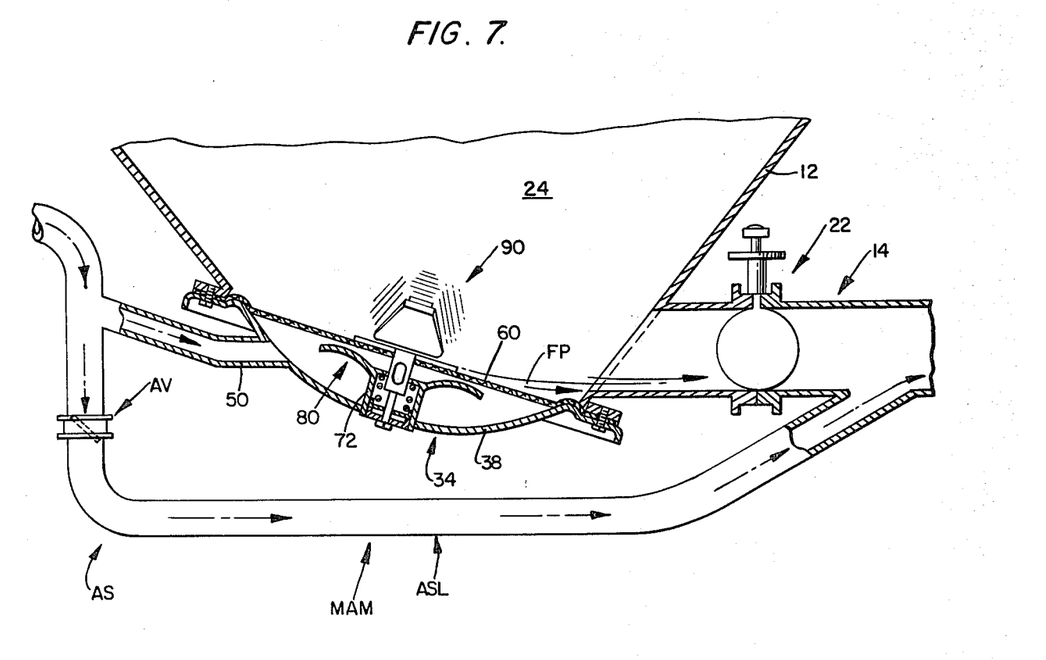

The air flowing upwardly through the membrane produces a layer of air moving upwardly from the membrane toward the hopper interior. This layer, or film, of air contacts the material which is to be discharged from the hopper, and which is located adjacent the membrane. The air is deflected toward the discharge conduit 14 due to the slanted nature of the membrane, thereby defining a moving film or layer of air which is flowing toward the discharge conduit. This moving film of air acts to sweep material off the membrane toward the discharge conduit. This effect will be denoted hereinafter as an "air sweep" effect. The air sweep effect not only assists in the discharge of material from the hopper 12, as indicated in FIGS. 3 and 4, but also assists in the movement of the final quantity of product from the hopper, as shown in FIGS. 6 and 7, wherein the final quantity of product FP is infuenced toward and through the discharge port 26 by the combined effect of the membrane movement, the air flowing into that port from the hopper, the air moving through the membrane, and the slanted orientation of the membrane. It is noted that without efficient aeration and vibration, air will escape via the port 26 as soon as an opening develops upon operation of the valve 22. As above-discussed, vast quantities of material remain undischarged from heretofore known hoppers because such material sticks to the bottom of the hopper at the end of the material discharge process. The above-discussed effects of the present invention prevent such sticking. Product movement is further assisted by the aerator and gravity. Product FP is thus strongly influenced toward the outlet port 26.

Figure 8:
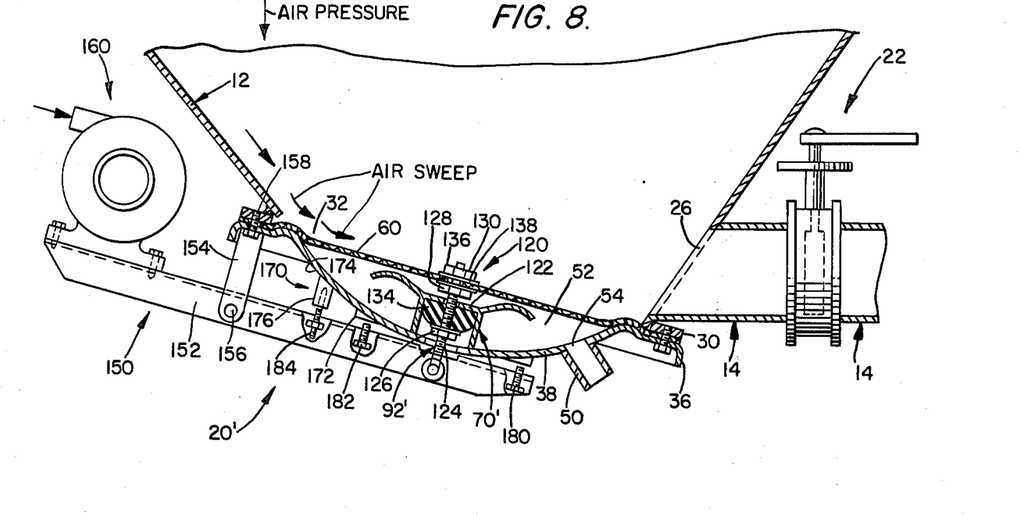
FIG. 8 is a side elevation of a hopper including an alternative embodiment of the device embodying the teachings of the present invention.
Figure 9:
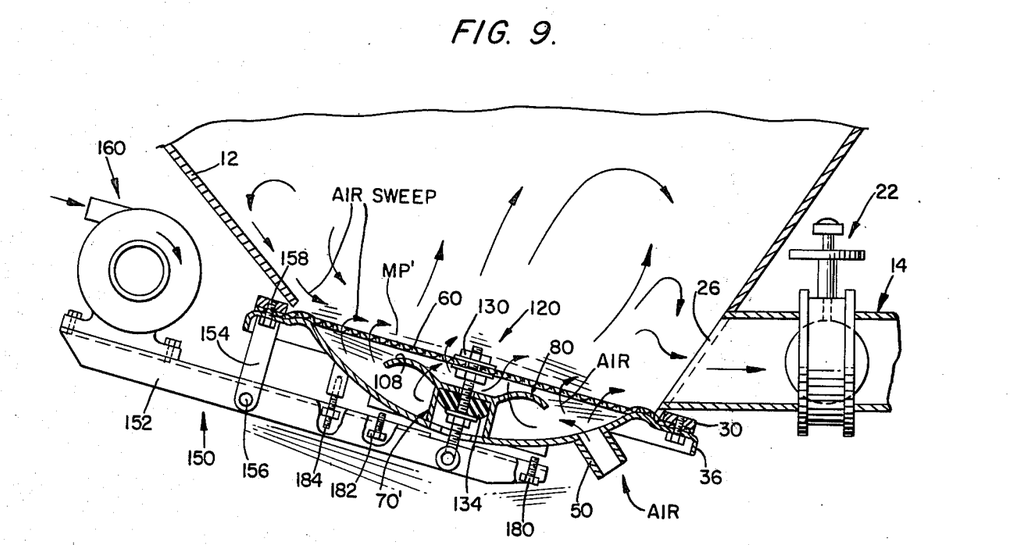
FIG. 9 is a side elevation of a hopper including the FIG. 8 embodiment indicating operation of that embodiment.

An alternative embodiment of the bottom unit is shown in FIGS. 8 and 9, and is denoted by the reference indicator 20′. The unit 20′ is similar to unit 20 in that a foraminous deformable membrane 60 is supported by a support 70′ to cover a hopper opening 32 and is oriented at an angle with respect to the horizontal. The discharge conduit 14 is also independent of the unit 20′.

The unit 20′ includes a membrane impulser 120 mounted on a cross-piece 122 of the membrane support 70′ by a fastener 92′. The fastener 92′ includes a threaded shank 124 to which nuts 126, 128 and 130 are attached. A grommet 134 is trapped between nut 126 and the cross-piece 122 to attenuate movement of the impulser. The membrane is sandwiched between the nuts 128 and 130 which include washers 136 and 138, respectively.

An air inlet 50 is also associated with the unit 20′ to ingest air into the interior 52 thereof as above-discussed with regard to the unit 20.

Movement of the membrane impulser is produced by vibrator unit 150 which includes a beam 152 attached near one end thereof to the fastener 92′, and to the flanges 30 and 36 via a brace 154, and pivot pin 156 and a fastener 158.

A vibration producer 160 is mounted on the beam on the end thereof remote from the fastener 92′ to generate vibration which is transmitted via the beam 152 and the fastener 92′ to the membrane to produce a pulsating movement of the membrane similar to that discussed above with regard to FIG. 4. Such membrane pulsating movement is indicated in FIG. 9 by the phantom lines MP′. Air injected into the unit interior 52 and flowing through the membrane assists the membrane pulsation as above-discussed.

The impulser includes adjustment means 170 for controlling the amplitude of movement of the membrane and adjusting the zero, or at-rest, position of the membrane with respect to the hopper opening. The adjustment means 170 includes a contact plate 172 on outer surface 174 of the body section 38, and downwardly depending tubular sleeve 176 on the body section. The tubular sleeve has internal threads defined therein. Adjustment screws 180 and 182 are threadably mounted in the beam and abut the contact plate to set the distance between that beam and the plate. A further adjustment screw 184 is threadably attached to the beam and is threadably attached to the tubular sleeve 176 for further adjusting the position of the beam with respect to the body section 38.

The vibration producer can include a motor, or the like.

Figure 10:
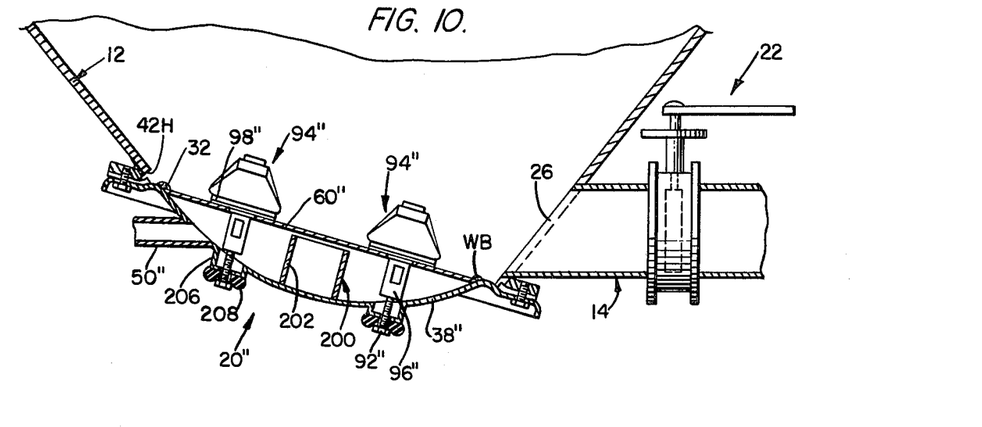
FIG. 10 is a side elevation of a hopper including yet another alternative embodiment of the device embodying the teachings of the present invention.
Figure 11:
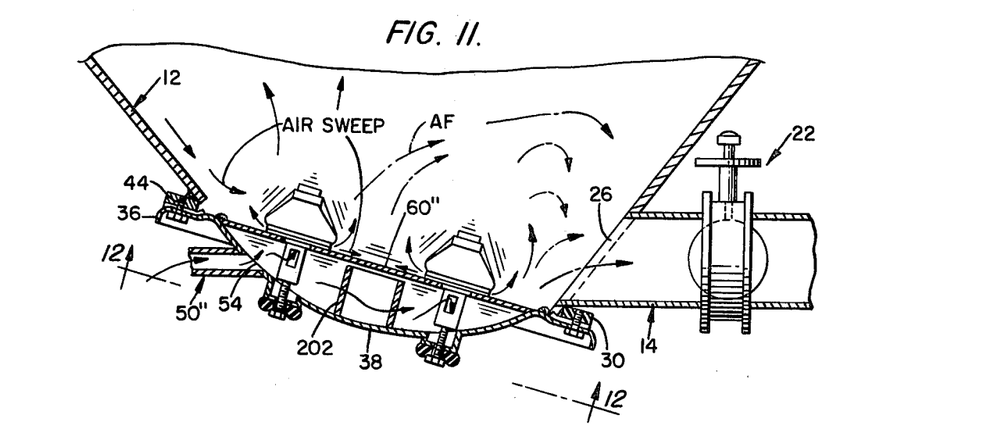
FIG. 11 is a side elevation of a hopper including the FIG. 10 embodiment indicating operation of that embodiment.
Figure 12:
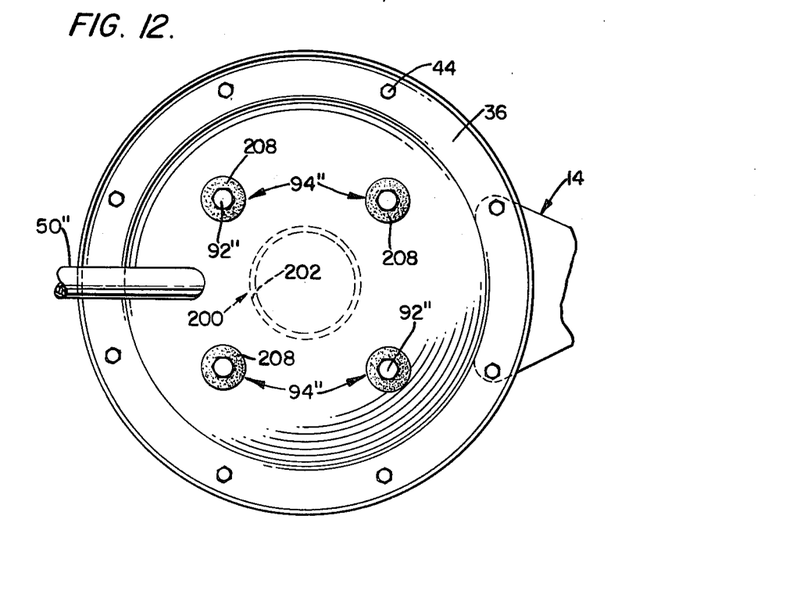
FIG. 12 is a view taken along line 12—12 of FIG. 11.

A further alternative embodiment of the bottom unit is shown in FIGS. 10–12 as bottom unit 20″. The unit 20″ includes a planar metal diaphragm 60″ covering hopper opening 32 and being attached to the bottom 38″ by welds WB, or the like. The unit 20″ includes a diaphragm support 200 which includes a tubular body 202 mounted at one end thereof to the inner surface of the body section 38, and having the other end thereof located subjacent the diaphragm 60″ to support that diaphragm when the hopper contains material. One form of the unit 20″ includes an air flow system 50″ which feeds air to the impulsers 94″. Another form of the unit 20″ does not include the air flow system 50″.

A plurality of aerator devices 94″ are located superjacent the diaphragm and include bolsters 98″. The aeration devices are located as shown in FIG. 12, and each device includes a mounting bracket 96″ attached to a fastener 92″. Each bracket has a flow hole defined therethrough so air flowing in the bottom unit moves as shown in FIG. 11 by arrows AF.

The fasteners 92″ are attached to mounting brackets 206 and include grommets 208 for damping movement of the aeration devices in a manner similar to the damping effect produced by the spring in the unit 20 shown in FIG. 2.

The unit 20″ produces a pulsating action combined with air sweeping and tilt-produced gravity assisted migration toward the discharge pipe 14 as above-discussed with regard to the units 20 and 20′. However, in the unit 20″, the air flow AF is supplied entirely by the vibrators 94″ as the diaphragm 60″ is not porous. Otherwise, the operation of the unit 20″ as in FIG. 11 is similar to those operations shown in FIGS. 4 and 9.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A discharge unit for use on hopper cars comprising:

a material discharge pipe connected to a car hopper;

an arcuate body section attached to the bottom of the car hopper to be independent of and spaced from said discharge pipe;

a flexible foraminous membrane mounted on said body section to cover the car hopper bottom, said membrane covering said body section to define a chamber, said membrane being tilted at an angle with respect to horizontal and sloping toward said discharge pipe;

air induction means connected to said body section to introduce air into said chamber, said air moving from said chamber through said foraminous membrane to form an air sweep which assists in moving material located in the hopper adjacent said membrane toward said discharge pipe; and vibration inducing means connected to said membrane for causing said membrane to pulsate relative to said body section, thereby assisting movement of material located in said hopper toward said discharge pipe.

2. The discharge unit defined in claim 1 wherein said angle is about 15°.

3. The discharge unit defined in claim 1 wherein said membrane includes fabric.

4. The discharge unit defined in claim 1 further including means for shunting air into said discharge pipe.

5. The discharge unit defined in claim 1 wherein said vibration inducing means includes an aerator device which fluidizes material in the hopper.

6. The discharge unit defined in claim 1 wherein said vibration inducing means includes a plurality of aerator devices each of which fluidizes material in the hopper.

7. The discharge unit defined in claim 1 wherein said vibration inducing means includes a beam connected to said body section and to said membrane and a motor mounted on said beam which induces vibration in said beam to be transmitted to said membrane.

8. The discharge unit defined in claim 7 further including adjustment means on said beam for controlling amplitude of movement of said beam and a zero position of said beam with respect to said body section.

9. The discharge unit defined in claim 1 further including a support mounted on said body section to support said membrane.

10. The discharge unit defined in claim 9 wherein said support is mushroom shaped.

11. The discharge unit defined in claim 1 further including an elastic means connected to said vibration inducing means for controlling movement of said vibration inducing means.

12. The discharge unit defined in claim 11 wherein said elastic means includes a spring.

13. The discharge unit defined in claim 11 wherein said elastic means includes a grommet.

14. The discharge unit defined in claim 11 further including baffle means on said vibration inducing means for directing air flow in said chamber.

15. The discharge unit defined in claim 1 wherein said car includes a railroad car.

16. A discharge unit for use on hopper cars comprising:
a material discharge pipe connected to a car hopper;
an arcuate body section attached to the bottom of the car hopper to be independent of and spaced from said discharge pipe;
a flexible membrane mounted on said body section to cover the car hopper bottom, said membrane covering said body section to define a chamber, said membrane being tilted at an angle with respect to horizontal and sloping toward said discharge pipe;
vibration inducing means connected to said membrane for causing said membrane to pulsate relative to said body section thereby assisting movement of material located in said hopper toward said discharge pipe; and
air induction means connected to said vibration inducing means to introduce air into the hopper for assisting in the movement of material located in the hopper toward said discharge pipe.

17. The discharge unit defined in claim 16 wherein said membrane is metal.

18. The discharge unit defined in claim 16 wherein said membrane is a non-foraminous membrane.

19. The discharge unit defined in claim 16 wherein said membrane is a foraminous membrane.

20. A discharge unit for use on hopper cars comprising:
a material discharge pipe connected to a car hopper;
an arcuate body section attached to the bottom of the car hopper to be independent of and spaced from said discharge pipe;
a flexible foraminous membrane mounted on said body section to cover the car hopper bottom, said membrane covering said body section to define a chamber, said membrane being tilted at an angle with respect to horizontal and sloping toward said discharge pipe;
air induction means connected to said body section to introduce air into said chamber, said air moving from said chamber through said foraminous membrane to form an air sweep which assists in moving material located in the hopper adjacent said membrane toward said discharge pipe; and
vibration inducing means connected to said membrane for causing said membrane to pulsate, thereby assisting movement of material located in said hopper toward said discharge pipe, said vibration inducing means comprising an aeration device which fluidizes material in the hopper.

21. The discharge unit defined in claim 20, wherein said vibration inducing means comprises a plurality of said aeration devices.

22. A discharge unit for use on hopper cars comprising:
a material discharge pipe connected to a car hopper;
an arcuate body section attached to the bottom of the car hopper to be independent of and spaced from said discharge pipe;
a flexible foraminous membrane mounted on said body section to cover the car hopper bottom, said membrane covering said body section to define a chamber, said membrane being tilted at an angle with respect to horizontal and sloping toward said discharge pipe;
air induction means connected to said body section to introduce air into said chamber, said air moving from said chamber through said foraminous membrane to form an air sweep which assists in moving material located in the hopper adjacent said membrane toward said discharge pipe; and
vibration inducing means connected to said membrane for causing said membrane to pulsate, thereby assisting movement of material located in said hopper toward said discharge pipe, said vibration inducing means including a beam connected to said body section and to said membrane and a motor mounted on said beam which induces vibration in said beam to be transmitted to said membrane.

23. The discharge unit defined in claim 22 further including adjustment means on said beam for controlling amplitude of movement of said beam and a zero position of said beam with respect to said body section.

24. A discharge unit for use on hopper cars comprising:
a material discharge pipe connected to a car hopper;
an arcuate body section attached to the bottom of the car hopper to be independent of and spaced from said discharge pipe;
a flexible foraminous membrane mounted on said body section to cover the car hopper bottom, said membrane covering said body section to define a chamber, said membrane being tilted at an angle with respect to horizontal and sloping toward said discharge pipe;

air induction means connected to said body section to introduce air into said chamber, said air moving from said chamber through said foraminous membrane to form an air sweep which assists in moving material located in the hopper adjacent said membrane toward said discharge pipe;

vibration inducing means connected to said membrane for causing said membrane to pulsate, thereby assisting movement of material located in said hopper toward said discharge pipe;

elastic means connected to said vibration inducing means for controlling movement of said vibration inducing means; and baffle means on said vibration inducing means for directing air flow in said chamber.

25. The discharge unit defined in claim 24 wherein said elastic means includes a spring.

* * * * *